United States Patent Office 2,731,536
Patented Jan. 17, 1956

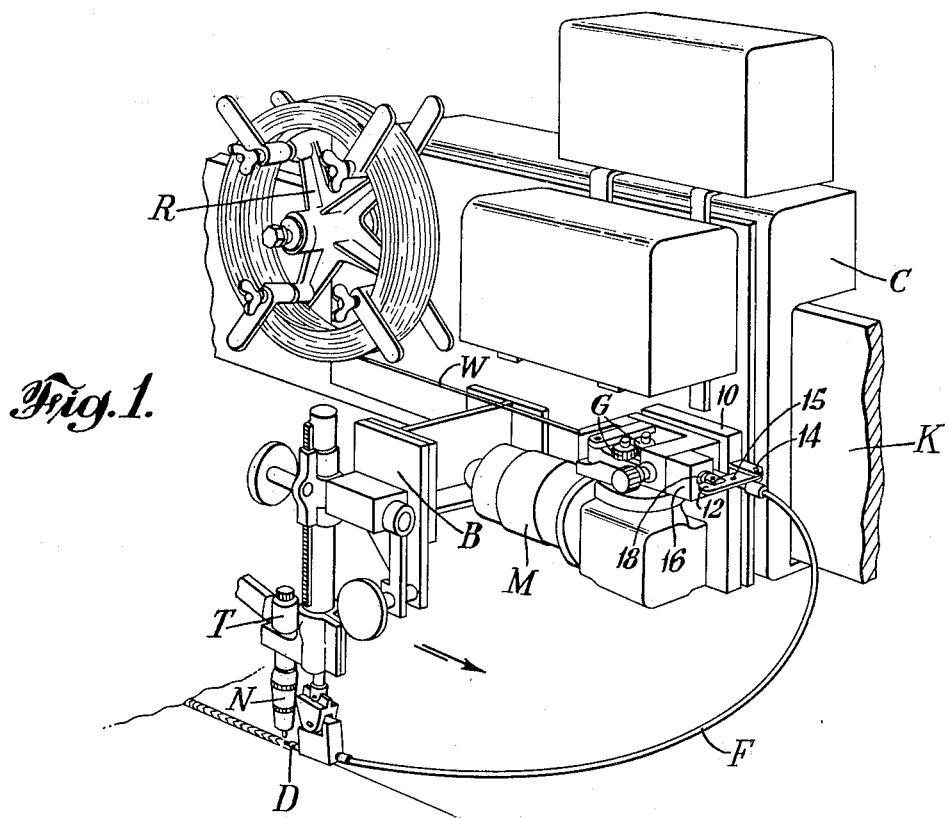
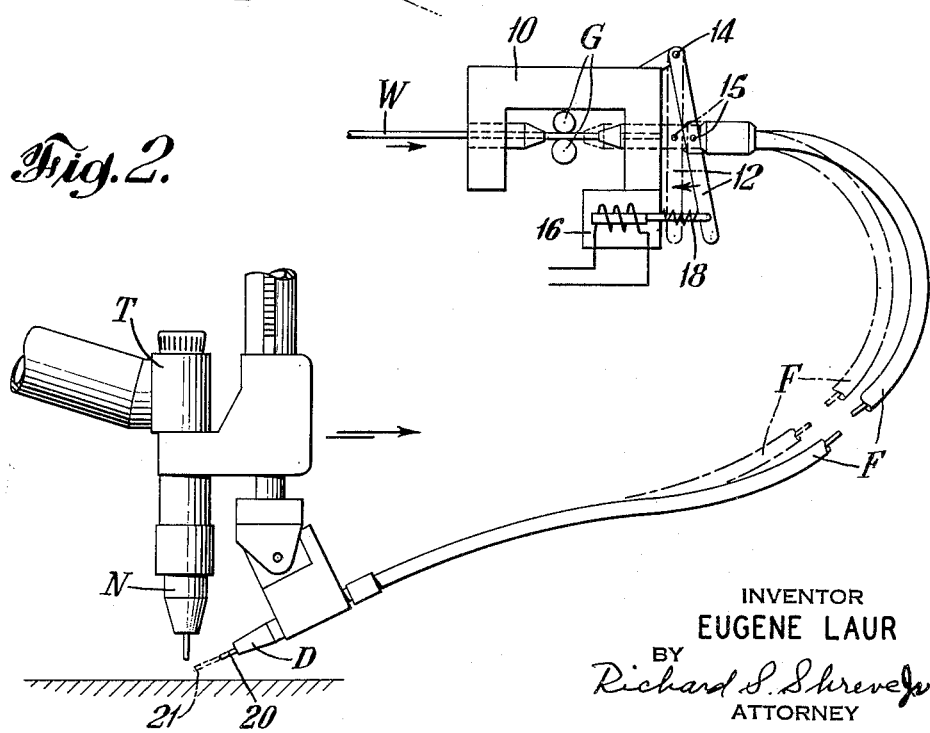
INVENTOR
EUGENE LAUR

2,731,536

WELDING WIRE POSITIONING

Eugene Laur, Lewiston, N. Y., assignor to Union Carbide and Carbon Corporation, a corporation of New York Application December 14, 1953, Serial No. 397,956

6 Claims. (Cl. 219—10)

This invention relates to welding wire positioning and more particularly to method of and apparatus for positioning welding wire in a mechanized rod feed to inert gas shielded arc welding puddles.

In this type of welding it is important that the wire be in position for immedate metal transfer the moment the arc is struck. This is extremely important in tungsten arc welding, because if the wire is not in position, the work receives the entire heat of the arc and burns through at the start of the weld, forming a sunken area. This condition exists until the wire is in conjunction with the arc, but generally correction does not occur until the arc has moved slightly over the seam.

Upon termination of the weld a further problem arises in that when the welding current is turned off, the wire has a tendency to freeze to the workpiece. This problem has generally been coped with by the insertion of an end tab or run off block past the weld seam, on which the welding current is turned off when sufficient wire has been melted after the wire feeding has been stopped, to prevent this freezing.

In apparatus heretofore provided the location of the control switches and their general sequence of operation are not of such a nature as to allow for the close coordination required of the arc starting and wire feed, and result in a loss of time for manual correction at the start and require additional material to prevent freezing at the end.

The objects of the present invention are therefore to avoid the difficulties at the start and completion of the weld referred to above, to offset the lack of coordination of the switches which control the welding current and wire feeding mechanism, and to provide a fast action automatic wire positioner for inert gas shielded arc welding.

According to the present invention, the wire is positioned by causing relative movement of the wire guide which directs the wire into the weld puddle, with respect to the traction rollers which feed the wire through the guide. Preferably the wire guide is on the end of a flexible conduit which is relatively slidable along the wire with respect to the traction rollers, and a lever fulcrumed on the housing of the traction rollers is pivoted to the flexible conduit, and a solenoid moves the lever to move the wire guide with respect to the traction rollers. Preferably the solenoid is turned on and off simultaneously with the welding current.

The wire positioner preferably consists of an attachment of a solenoid to the housing of the wire feeding traction rolls, a linkage attachment operated by the solenoid and connected to the entrance end of the flexible conduit for the wire, and the automatic control of the solenoid operated simultaneously with, and controlled directly by, the welding current. The purpose of the solenoid linkage operation is to alter the distance between the entrance of the flexible conduit to the wire guide, and the center line of the feed rolls. Since the wire moves only forward and at constant speed, the lengthening of the distance between the flexible conduit entrance and the feed rolls would in effect lengthen the tube through which a fixed length of wire is traveling, and hence result in shortening the length of wire protruding from the wire guide to a retracted position. Conversely, the shortening of the space between the conduit entrance and the feed rolls would shorten the tube through which the same length of wire is traveling, thereby extending the portion of the wire which protrudes from the end nozzle toward the arc.

In the drawings:

Fig. 1 is a perspective view of a machine welding carriage having a mechanized wire feed provided with a wire positioner according to, and for carrying out the method of, the present invention; and Fig. 2 is a diagram showing the details of the wire positioner mechanism.

The welding machine comprises a carriage C movable along a track K and carrying a bracket B which supports an inert gas shielded arc welding torch T, having a nozzle N for directing the shielding gas. The carriage C also carries a reel R which supplies wire W to gripper rolls G driven by motor M. The gripper or traction feed rolls G push the wire through a flexible conduit F to a guide D suitably adjustably supported on the bracket B, to direct the wire into the weld puddle formed by the arc struck by the torch T and shielded by the inert gas from the nozzle N.

As shown in Fig. 2 the traction rollers G are journaled in a housing 10 rigidly mounted on the carriage C. The flexible conduit F is mounted to be relatively movable along the wire W with respect to the frame 10 and rollers G. A lever 12 is fulcrumed on the frame 10 as at 14 and is pivoted as at 15 to the flexible conduit F. The other end of the lever 12 is connected to a solenoid 16, remotely controlled by coordination with the switch controlling the welding current. A return spring 18 is interposed between the solenoid 16 and the end of the lever 12.

The full line position of the linkage represents the off position of the solenoid with the resultant retracted position 20 of the wire in its relationship to the electrode, a position not compatible for metal transfer. When the welding current is applied, the solenoid is instantly energized and acts against the return spring to bring the linkage to the dotted line position, which shortens the distance between the entrance of the flexible conduit and the traction rolls, thereby automatically extending the wire toward the arc at position 21 for immediate transfer.

Since the striking of the arc and activation of the solenoid to position the wire are coordinated by the switch controlling the welding current, conditions for immediate metal transfer at the start of the weld are met. At the terminal portion of the weld seam, the shutting off the current deenergizes the solenoid and the return spring automatically activates a retraction of the wire, thereby preventing further metal transfer and resultant freezing of the wire to the work.

The attachment, being automatic, represents a saving in time, produces a more efficient fluidity of operation, and obviates the necessity of end tabs, thereby adding economy to inert gas shielded arc welding.

I claim:

1. In a method of inert gas shielded arc welding in which the arc forms a weld puddle, the weld puddle is shielded by a stream containing inert gas, and a wire is fed by wire feeder means along inside a conduit and through a guide into the weld puddle, the improvement which comprises positioning the end of the wire longitudinally with respect to said guide by causing relative movement of said conduit and guide longitudinally of the wire with respect to said wire feeder means.

2. In a method of inert gas shielded arc welding in which the arc forms a weld puddle, the weld puddle is shielded by a stream containing inert gas, and a wire is fed by wire feeder means along inside a conduit and through a guide into the weld puddle, the improvement which comprises projecting the end of the wire out of the guide for starting purposes at the beginning of a welding operation by retracting the entrance end of said conduit along longitudinally of the wire toward said wire feeder means.

3. In a method of inert gas shielded arc welding in which the arm forms a weld puddle, the weld puddle is shielded by a stream containing inert gas, and a wire is fed by wire feeder means along inside a conduit and through a guide into the weld puddle, the improvement which comprises withdrawing the wire into the guide to retract the end thereof for stopping purposes at the end of a welding operation by advancing the entrance end of said conduit along longitudinally of the wire away from said wire feeder means.

4. In apparatus for inert gas shielded arc welding having means for striking an arc to form a weld puddle, means for supplying a stream containing inert gas to shield said weld puddle, a conduit terminating in a guide, and wire feeder means for feeding a wire along said conduit and through said guide into said weld puddle, the improvement which comprises means for positioning the end of the wire with respect to said guide, including means for causing relative movement of the entrance end of said conduit longitudinally of the wire with respect to said wire feeder means.

5. In apparatus for inert gas shielded arc welding having means for striking an arc to form a weld puddle, means for supplying a stream containing inert gas to shield said weld puddle, a conduit terminating in a guide, and wire feeder means for feeding a wire through said guide into said weld puddle, the improvement which comprises means for mounting the entrance end of said conduit for movement along the wire relative to said wire feeder means, and remote control means for causing such relative movement of said entrance end.

6. In apparatus for inert gas shielded arc welding having means for striking an arc to form a weld puddle, means for supplying a stream containing inert gas to shield said weld puddle, a flexible conduit terminating in a wire guide, and a frame journaling traction rollers for feeding a wire through said conduit and out through said guide, the improvement which comprises means for mounting said flexible conduit for movement along the wire relative to said traction rollers, a lever fulcrumed on said roller frame and pivoted to said flexible conduit, and a solenoid for moving said lever to move said wire guide relative to said rollers.

References Cited in the file of this patent

UNITED STATES PATENTS

| 2,093,881 | Conrad | Sept. 21, 1937 |
| 2,442,017 | Price | May 25, 1948 |
| 2,504,837 | Hills | Apr. 18, 1950 |
| 2,681,401 | Anderson | June 15, 1954 |

FOREIGN PATENTS

| 147,554 | Great Britain | Oct. 3, 1921 |